C. J. DAVIDSON.
SLIDE RULE.
APPLICATION FILED DEC. 7, 1918.
1,343,549.
Patented June 15, 1920.
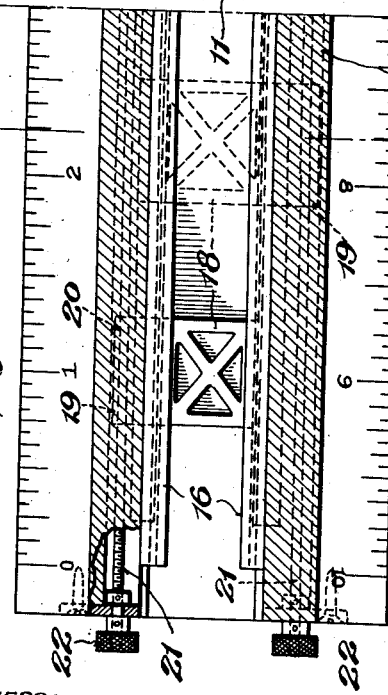
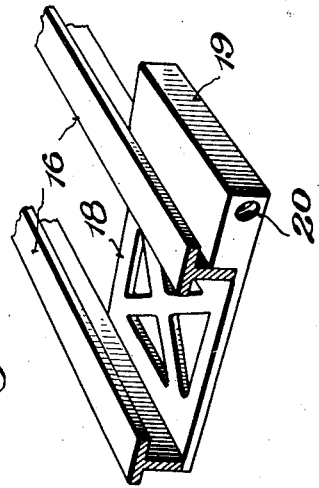
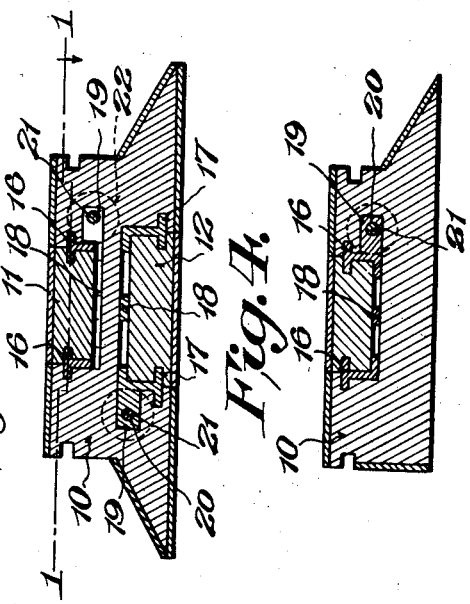
Inventor
C. J. Davidson,
By Meyers Cushman & Rea
Attorneys
Witness:

UNITED STATES PATENT OFFICE.

CLINTON J. DAVIDSON, OF BERKELEY, CALIFORNIA.

SLIDE-RULE.

1,343,549.  Specification of Letters Patent.  Patented June 15, 1920.

Application filed December 7, 1918. Serial No. 265,751.

*To all whom it may concern:*

Be it known that I, CLINTON J. DAVIDSON, a citizen of the United States, residing at Berkeley, in the county of Alameda and State of California, have invented new and useful Improvements in Slide - Rules, of which the following is a specification.

The present invention relates to improvements in slide rules and has for its object to provide means by which accurate alinement of graduations on the relative sliding and stationary members may be more readily obtained than with the forms commonly in use.

Such rules commonly comprise a body provided with a slide-way having a scale along one or both of its margins and a graduated slide mounted in said way. In operating the device it is necessary to adjust the slide to position a particular graduation thereon in alinement with a graduation on one of the body scales and in order to make the desired computations, etc., it is, of course, necessary that the alinement of said graduations be very accurate. The graduations or points should be brought within from one one-hundredth to one one-thousandth of an inch of opposition. To prevent the slide from moving unduly freely in this way, it is usual to have the parts so arranged that there will be considerable friction between the moving parts. This, while it is of advantage in maintaining the parts in adjusted position, renders it difficult to obtain the necessary fine adjustments, when the slide is, as ordinarily, manually moved.

By the present invention means are provided whereby the slide may be readily adjusted manually, relative to the body, and then actuated by a power means, operable from beyond one end of the body, for securing the fine and accurate alinement of graduations on the scales that is required.

In the accompanying drawings:—

Figure 1 is a plan view of the end portions of a rule constructed in accordance with the present invention, a portion of the body being broken away at one end and the other end portion being in section on the line 1—1 of Fig. 2.

Fig. 2 is a transverse section on the line 2—2 of Fig. 1.

Fig. 3 is a detail view.

Fig. 4 is a view similar to Fig. 2 showing a form of the invention in which only a single slide member is provided.

Referring to the drawings, 10 designates the body of the device which in the embodiment illustrated in Figs. 1 and 2 is provided with slide ways or grooves in its top and bottom faces in which are mounted slide bars 11, 12 having suitable scales on their outer faces. The body is provided, as usual with scales 13, 14 extending longitudinally of the slide ways or grooves, and in addition, in the form referred to, scales 15, 15ª are provided on the upper inclined faces of the expanded base portion of the body.

The slide bars 11, 12 are supported by rails 16, 17 that fit alined grooves formed in opposite side faces of said bars and in the side walls of the ways provided therefor in the body 10. These rails, as shown, are of substantially T-form in cross-section and at suitable intervals the webs thereof are connected by bridge plates 18 that extend transversely across the slide ways. The bridging members or plates 18 are provided at one side with projections 19, through each of which extend interiorly threaded passages 20 and a screw rod 21, mounted in bearings at the opposite ends of the body 10, extends through and engages the threads within said passages. By means of a suitable head 22 at one end of the screw rod, the said rod may be turned and by its engagement with the interiorly threaded sleeve-like members of the bridging plates 18 will operate to move the guide rails longitudinally of the slide way in the body 10.

The graduated slide bar fits the inner edges of the guide rails so closely that while it may be manually moved relative thereto it will also be moved with said rails when the latter are adjusted by turning the threaded shaft as above described. This enables the operator to readily adjust by hand the graduated slide bar to bring any desired graduation thereon into substantial alinement with a graduation on one of the relatively stationary scales along the side of the slide way and then by turning the screw shaft said bar may be further moved to effect accurate alinement between said graduations.

In the embodiment of the invention illustrated, the guide rails for each slide bar are connected by two bridging members and, as shown, the parts are so arranged that the adjusting screws are at opposite sides of the slide ways formed in the body.

In Fig. 4 there is illustrated a slight modification of the invention in which the body 10 is provided with but a single slide bar which is supported and adapted to be adjusted relative to the body in the same manner and by the means hereinbefore referred to.

The manner of operating and the advantages of a slide rule constructed as hereinbefore described will be readily appreciated.

While as herein shown the bridges 18 connecting the rails 16, 17 are drawn as formed integral with the ends of said rails, it is obvious that if desired said plates may be formed separately and suitably attached to the rails.

Having thus described the invention, what is claimed is:

1. A device of the character described, comprising a body having a slide way formed in one face, and a scale extending along the margin of said way, an auxiliary slide mounted in said way, a graduated slide mounted in said auxiliary slide, and a power device for moving the auxiliary slide relative to the way to effect accurate alinement of the scale on the slide with the scale on the slide way, said slide being manually adjustable in the slide way independent of any actuation of the power device.

2. A device of the character described, comprising a body having a slide way formed in one face and a scale extending along the margin of said way, a graduated slide mounted in said way, a screw shaft mounted in bearings in the body and projecting beyond one end thereof, and connections including an auxiliary slide between said shaft and slide whereby the latter may be adjusted along the slide way by turning said shaft, the connection between the slide and shaft permitting movement of the slide along the way independent of any movement of the shaft.

3. A device of the character described comprising a body having a longitudinally extending slide way formed in one face and provided with a scale extending along a margin of said way, a pair of guide rails fitted in grooves in the side walls of the slide way, a graduated slide arranged within the slide way and engaging said rails, said slide being movable relative to said rails and slide way to secure approximate alinement between a graduation thereon and a graduation of the scale on the body, and means for adjusting said rails and slide together relative to the body, for the purpose described.

4. A device of the character described comprising a body having a longitudinally extending slide way formed in one face and provided with a scale extending along a margin of said way, a pair of guide rails fitted in grooves in the side walls of the slide way, a graduated slide arranged within the slide way and engaging said rails, said slide being movable relative to said rails and slide way to secure approximate alinement between a graduation thereon and a graduation of the scale on the body, means connecting said rails at an intermediate point in their length and extending across the bottom of the slide way, and means coöperating with said rail connecting means for simultaneously moving said rails and slide relative to the body.

5. A device of the character described comprising a body having a longitudinally extending slide way formed in one face and provided with a scale extending along a margin of said way, a pair of guide rails fitted in grooves in the side walls of the slide way, a graduated slide arranged within the slide way and engaging said rails, said slide being movable relative to said rails and slide way to secure approximate alinement between a graduation thereon and a graduation of the scale on the body, a bridge member connecting said rails and extending beneath the graduated slide, and power devices operable from one end of the body for moving both the guide rails and slide longitudinally of the body.

6. A device of the character described comprising a body having a longitudinally extending slide way formed in one face and provided with a scale extending along a margin of said way, a pair of guide rails fitted in grooves in the side walls of the slide way, a graduated slide arranged within the slide way and engaging said rails, said slide being movable relative to said rails and slide way to secure approximate alinement between a graduation thereon and a graduation of the scale on the body, a bridge member connecting said rails and extending beneath the graduated slide, and a screw rod mounted in bearings in the body and projecting beyond one end thereof, said rod engaging the bridge member whereby it is adapted to move both the rails and intermediate slide relative to the body.

7. A device of the character described comprising a body having a longitudinally extending slide way formed in one face and provided with a scale extending along a margin of said way, a pair of guide rails fitted in grooves in the side walls of the slide way, a graduated slide arranged within the slide way and engaging said rails, said slide being movable relative to said rails and slide way to secure approximate alinement between a graduation thereon and a graduation of the scale on the body, a bridge member connecting said rails and extending beneath the graduated slide, said member being provided at one side with an interiorly threaded sleeve, and a screw rod mounted in bearings in the body and extending through said sleeve with one end projecting beyond the body, for the purpose described.

8. A device of the character described comprising a body having a longitudinally extending slide way formed in one face and provided with a scale extending along a margin of said way, a frame mounted in said way and including two T rails connected by means extending across the slide way and having the outer edges of their heads fitting grooves in the side walls of said slide way, a graduated slide having its longitudinal edges grooved and embracing the inner edges of the heads of said rails, and means operable from beyond an end of the body for moving said frame and slide relative to the body.

In testimony whereof I have hereunto set my hand.

CLINTON J. DAVIDSON.